(12) United States Patent
Brown et al.

(10) Patent No.: US 7,647,293 B2
(45) Date of Patent: Jan. 12, 2010

(54) DETECTING CORRELATION FROM DATA

(75) Inventors: Paul Geoffrey Brown, San Jose, CA (US); Peter Jay Haas, San Jose, CA (US); Ihab F. Ilyas, West Lafayette, IN (US); Volker G. Markl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 10/864,463

(22) Filed: Jun. 10, 2004

(65) Prior Publication Data
US 2005/0278357 A1  Dec. 15, 2005

(51) Int. Cl.
G06F 17/30 (2006.01)
(52) U.S. Cl. .................. 707/2; 707/1; 707/3; 707/4
(58) Field of Classification Search .............. 707/3
See application file for complete search history.

(56) References Cited

U.S. PATENT DOCUMENTS

| | | | |
|---|---|---|---|
| 6,272,487 B1 * | 8/2001 | Beavin et al. .................. 707/2 |
| 6,353,818 B1 | 3/2002 | Carino, Jr. | |
| 6,385,608 B1 * | 5/2002 | Mitsuishi et al. .............. 707/6 |
| 6,662,175 B1 * | 12/2003 | Ghazal et al. ................. 707/2 |
| 7,447,681 B2 * | 11/2008 | Lightstone et al. ........... 707/3 |
| 7,478,083 B2 * | 1/2009 | Corvinelli et al. ............ 707/3 |
| 2002/0198867 A1 | 12/2002 | Lohman et al. | |
| 2003/0212664 A1 | 11/2003 | Breining et al. | |
| 2004/0098358 A1 | 5/2004 | Roediger | |
| 2005/0097072 A1 * | 5/2005 | Brown et al. .................. 707/1 |
| 2005/0102325 A1 * | 5/2005 | Gould et al. ............... 707/104.1 |
| 2005/0114368 A1 * | 5/2005 | Gould et al. ................ 707/100 |
| 2005/0114369 A1 * | 5/2005 | Gould et al. ................ 707/100 |

OTHER PUBLICATIONS

G. Grahne, L. V. S. Lakshmanan, and X. Wang. "Interactive mining of correlations—constraint perspective". In 1999 ACM SIGMOD Workshop on Research Issues in Data Mining and Knowledge Discovery, 1999.*

Stillger et al., "LEO-DB2's Learning Optimizer," Proceedings of hte 27th VLDB Conference, Rome, Italy, 2001, <http://www.dia.uniroma3.it/~vldbproc/006_019.pdf>.

Boulton, "Big Blue Aiming 'Stinger' at Oracle, Microsoft," May 3, 2004, <http://www.internetnews.com/ent-news/article.php/3348331>.

* cited by examiner

Primary Examiner—Neveen Abel Jalil
Assistant Examiner—Christyann R Pulliam
(74) Attorney, Agent, or Firm—IP Authority, LLC; Ramraj Soundararajan

(57) ABSTRACT

A system and method of discovering dependencies between relational database column pairs and application of discoveries to query optimization is provided. For each candidate column pair remaining after simultaneously generating column pairs, pruning pairs not satisfying specified heuristic constraints, and eliminating pairs with trivial instances of correlation, a random sample of data values is collected. A candidate column pair is tested for the existence of a soft functional dependency (FD), and if a dependency is not found, statistically tested for correlation using a robust chi-squared statistic. Column pairs for which either a soft FD or a statistical correlation exists are prioritized for recommendation to a query optimizer, based on any of: strength of dependency, degree of correlation, or adjustment factor; statistics for recommended columns pairs are tracked to improve selectivity estimates. Additionally, a dependency graph representing correlations and dependencies as edges and column pairs as nodes is provided.

13 Claims, 6 Drawing Sheets

FIGURE 2 – REPLACEMENT SHEET

ALGORITHM *Detect Correlation*
INPUT : A Column pair $C_1, C_2$ with $C_1|_R \geq C_2|_R$

*Discover Trivial Cases*
1. a. IF $|C_i|_R \geq (1 - \varepsilon_1) R$ for $i = 1$ or $i = 2$    200
      THEN $C_i$ is a soft key; RETURN.
   b. IF $|C_i|_R = 1$ for $i = 1$ or $i = 2$    202
      THEN $C_i$ is a trivial column; RETURN.

*Sampling*
2. Sample R to produce a reduced table S.    204

*Detect Soft Functional Dependencies in the Sample*
3. a. Query S to get $|C_1|_S, |C_2|_S$ and $|C_1, C_2|_S$.    206
   b. IF $|C_1, C_2|_S \leq \varepsilon_2 |S|$
      AND $|C_1|_S \geq (1 - \varepsilon_3)|C_1, C_2|_S$    208
      THEN $C_1 \Rightarrow C_2$; RETURN.

*Skew Handling for Chi-Squared Test*
4. FOR $i = 1, 2$
   a. IF $\sum_{j=1}^{N_i} F_{ij} \geq (1 - \varepsilon_4)|R|$
      THEN
         $SKEW_i = TRUE;$    210
         $d_i = N_i;$
         FILTER = "$C_i$ IN $\{V_{i1}, \ldots, V_{iN_i}\}$"    212
      ELSE
         $SKEW_i = FALSE;$
         $d_i = \min(|C_i|_R, d_{max});$
         FILTER = NULL.
   b. Apply FILTER.

*Sampling-Based Chi-Squared Test*
5. a. Initialize each $n_{ij}, n_{i.},$ and $n_{.j}$ to 0.    214
   b. FOR EACH column-value pair $(x_1, x_2)$
         $i = Category(1, x_1, d_1, SKEW_1);$
         $j = Category(2, x_2, d_2, SKEW_2);$    216
         Increment $n_{ij}, n_{i.},$ and $n_{.j}$ by 1;
   c. IF $\sum_{i=1}^{d_1} \sum_{j=1}^{d_2} IsZero(n_{ij}) > \varepsilon_5 d_1 d_2$
      THEN $C_1$ and $C_2$ are correlated; RETURN.    218
   d. Compute $x^2$ as in (1); set $v = (d_1 - 1)(d_2 - 1)$    220
      and $t = G_v^{-1}(1 - p)$.
   e. IF $x^2 > t$
      THEN $C_1$ and $C_2$ are correlated; RETURN.    222
      ELSE $C_1$ and $C_2$ are independent; RETURN.

---

FUNCTION Category $(i, x, d, SKEW)$

IF SKEW = TRUE
THEN RETURN $j$ such that $x = V_{ij}$
ELSE RETURN $1 + [Hash(x) \mod d]$.

ALGORITHM *RecommendCGS*
INPUT: Discovered correlations and soft FDs

1. Sort correlated pairs, $(C_i, C_j)$ in ascending order of $p$-value } 500
2. Sort soft FDs in descending order of estimated strength } 502
3. Break ties by sorting in descending order of the adjustment factor $|C_i| |C_j| / |C_i,C_j|$ } 504
4. Recommend the top $k_1$ correlated column pairs and the top $k_2$ soft FDs to the optimizer } 506

FIGURE 5

DETECTING CORRELATION FROM DATA

BACKGROUND OF THE INVENTION

1. Field of Invention

The present invention relates generally to the field of relational database query optimization. More specifically, the present invention is related to correlation detection and dependency discovery between columns in a relational database.

2. Discussion of Prior Art

Dependencies between columns in relational databases can be exploited to optimize queries, but can also result in inaccurate estimates produced by query optimizers. Because query optimizers usually assume that columns are statistically independent, unaccounted for dependencies can lead to selectivity underestimation of conjunctive predicates by several orders of magnitude. Often-times a query optimizer in a relational database chooses a sub-optimal plan because of the inaccurate assumption of independence between two or more columns. Such an assumption is often made by query optimizers known in the art because it simplifies estimation; for example, the selectivity of conjunctive predicates based on two columns can be estimated by simply multiplying the individual selectivity of a column with the other.

Addressing these issues of relaxing statistical independence assumptions in selectivity estimations are query-driven and data-driven approaches. Query-driven approaches focus on information contained in a query workload, whereas data-driven methods analyze data values to discover correlations, or general statistical dependencies, between relational database columns. By stating the existence of a soft functional dependency (FD) between columns $C_1$ and $C_2$, a generalization of the classical notion of a hard FD in which a value in $C_1$ completely determines a corresponding value in $C_2$ is implied. A soft FD, denoted by $C_1 \Rightarrow C_2$, indicates that a value of $C_1$ determines a corresponding value in $C_2$ not with certainty, but with high probability. An example of a hard FD is given by "Country" and "Continent"; the former completely determines the latter. On the other hand, a soft FD between the make and model of a car is shown in the following example; given that "Model=323", "Make=Mazda" with high probability and "Make=BMW" with small probability. Two types of trivial cases are also identified; a soft key having a small number of distinct values in a given column and a trivial column having either only null values or only a single distinct value in a given column. The values in any row of a trivial column are trivially determined by values in any other column, which leads to spurious correlations.

In non-patent literature "*Exploiting Statistics on Query Expressions for Optimization*", Bruno and Chaudhuri disclose the use query workload (i.e. a list of relevant queries) together with optimizer estimates of query execution times for determining a beneficial set of Statistics of Intermediate Tables (SITS) to retain. SITS are statistics on query expressions that can be used to avoid large selectivity estimation errors due to independence assumptions.

Alternatively, a query feedback system (QFS) uses feedback from query execution to increase optimizer accuracy. In "LEO-DB2™'s learning optimizer" by Markl et al., DB2™ learning optimizer (LEO) is presented as a typical example of a QFS. LEO compares the actual selectivities of query results with a query optimizer's estimated selectivities. In this way, LEO can detect errors caused by faulty independence assumptions and create adjustment factors which can be applied in the future to improve the optimizer's selectivity estimates.

The self-adaptive histogram set (SASH) algorithm, disclosed in "*A self-adaptive histogram set for dynamically changing workloads*" by Lim et al., discloses another query-driven approach by creating clusters of disjoint columns in a relational database. Clustered columns are treated as being correlated whereas columns in different clusters are considered independent. In other words, SASH approximates the full joint distribution of the columns by maintaining detailed histograms on certain low-dimensional marginals in accordance with a high-level statistical interaction model. Joint frequencies are then computed as a product of marginals. Maintaining detailed histograms together with a high-level statistical interaction model can be very expensive, which limits the applicability of the SASH algorithm in commercial systems. As with other query feedback systems such as LEO, less optimal query plans can be chosen if the system has not yet received enough feedback, either during the initial startup period or after a sudden change in query workload. During one of these slow learning phases, a query optimizer is likely to avoid query plans with accurate feedback-based cost estimates in favor of other plans that appear to be less expensive, due to cost estimates based on limited quantities of actual data and faulty independence assumptions.

Most data-driven methods use discovered correlations to construct and maintain a synopsis (lossy compressed representation) of the joint distribution of numerical attributes. Getoor, et al., for example, use probabilistic relational models extending Bayesian network models to the relational setting for selectivity estimation in "*Selectivity estimation using probabilistic models*". Deshpande, et al. provide a technique in "*Independence is Good: Dependency-based histogram synopses for high-dimensional data*" which, similarly to SASH, combines a Markov network model with a set of low-dimensional histograms. However, synopses are constructed based on a full scan of the base data rather from query feedback. Both of the foregoing techniques search through the space of possible models and evaluate them according to a scoring function. As with SASH, the high cost of these methods severely limits their practical applicability.

The method of Cheng et al. provided in "*Learning belief networks from data: An Information theory based approach*" typifies a slightly different approach to constructing a synopsis (specifically, a Bayesian network model) from the base data. Instead of searching through a space of possible models, the method assesses the dependency between pairs of columns by using conditional independence tests based on a "mutual information" measure. The method requires that all attributes be discrete and that there be no missing data values. The method is also not scalable as it requires processing of the entire dataset.

Mining association rules and semantic integrity constraints are approaches limited in that dependencies involve relationships between a few specific values of a pair of attributes, rather than an overall relationship between attributes themselves. For example, an association might assert that ten percent of married people between ages fifty and sixty have at least two cars. This rule concerns specific values of marital status, age, and number of cars attributes.

To account for statistical interdependence between columns of in a relational database, the "bump-hunting" system (B-HUNT) disclosed by Haas et al. in "*BHUNT: Automatic discovery of fuzzy algebraic constraints in relational data*" searches for column pairs that might have interesting and useful correlations by systematically enumerating candidate pairs and simultaneously pruning candidates that do not appear promising by using a flexible set of heuristics. B-HUNT also analyzes a sample of rows in order to ensure scalability to larger relational databases. B-HUNT uses bump hunting techniques to discover soft algebraic relationships between columns having numerical attributes. General correlations between categorical values are not considered.

The non-patent literature by Brin, Motwani, and Silverstein, "*Beyond Market Baskets: Generalizing Association Rules to Correlations*" discloses the determination of "correlation rules" in a market-basket context. Brin et al. propose the use of chi-square tests to check for independence; the use of chi-square tests for testing independence is well-known in the art. Brin et al. do not disclose a setting that is for general numeric data and several types of general statistical dependencies, not a specialized type of dependency based on "market-basket" input transaction records. Brin et al. does not address sequential testing for different kinds of dependencies, arranging data in buckets such that the chi-square contingency table has an appropriate, data-dependent number of rows and columns, using data sampling to make algorithm scalable, systematically choosing likely pairs for analysis by combining exhaustive enumeration with heuristic pruning, and ranking the detected correlated column pairs, so that highest ranked pairs are first recommended to the query optimizer U.S. Pat. No. 5,899,986 requires a workload to determine what set of statistics to create, and relies on information in the system catalog to determine what column groups to generate statistics on, as opposed to a sample. The patent is limited in that it does not provide for a determination of relationships between tables, and is not enabled to discover general correlations through a chi-square test, nor does it rank discovered correlations. Function dependence detection in the disclosed invention is based on information from a systems catalog, not on information based on a sample.

Prior art is limited in that there is no premise for determining correlations between general categorical attributes, nor is there a robust method for determining numerical correlations. Additionally, prior approaches are limited in their provision of correlation and dependency information to a query optimizer, a priori. By contrast, the present invention provides for prioritization of a priori column pair and statistic recommendations to a query optimizer with respect to any of: a degree of correlation, strength of dependency, or adjustment factor.

Whatever the precise merits, features, and advantages of the above cited references, none of them achieves or fulfills the purposes of the present invention.

SUMMARY OF THE INVENTION

The system and method of the present invention discover statistical correlations and identify soft functional dependencies between column pair attributes, in a single relational database and across multiple relational databases. Database system catalog statistics and a random sample are utilized to detect the existence of soft functional dependencies and to test for the existence of correlations between either numerical attributes or categorical attributes for columns in a pair. Also provided is a dependency graph representation comprised of node pairs representing discovered column pairs and proportionately weighted edges representing the strength of functional dependencies and correlations between columns in a pair.

Prior to correlation detection analyses, candidate column pairs representing potentially correlated attributes and values are generated. A set of heuristic pruning rules specifying constraints are simultaneously applied to limit the number of column pairs generated. Pruning rules are comprised of constraints based on allowable data types, statistical properties of columns, schema information, and workload information. For each candidate column pair that has not been pruned, actual dependencies, if any, are determined during subsequent correlation detection analysis by utilizing system catalog statistics and, if needed, a random sample of values selected from column pairs.

In an initial step of correlation detection, given a candidate column pair as input, system catalog statistics are analyzed to determine whether correlation between columns is spurious. Using a specific system catalog statistic, the number of distinct values in a given column, it is determined whether one or both columns in a candidate column pair is "trivial" in that it is either single-valued or a soft key. If it is determined as such, then the candidate column pair is discarded.

If an input column pair is not discarded, then in a subsequent step, a random sample of value pairs is selected and sampled data is used to test the input column pair for the existence of a soft functional dependency. The existence of a soft FD is asserted if the value in one column implies with high probability the corresponding value in the other column, and is determined by a ratio of the number of distinct values in the two input columns, as determined from sampled data.

If a functional dependency is not detected during the second step of correlation detection, value pairs from a random sample are analyzed for the presence of correlation by using a robust, statistical chi-squared test. Prior to statistical testing, values in each column are categorized and a contingency table is created to carry out a chi-squared test. Candidate columns are declared correlated if either: the number of zeros in an associated contingency table is greater than a specified number; or if both the number of zeros in an associated contingency table is less than a specified number and a corresponding chi-squared statistic for an associated contingency table exceeds a specified value. The degree of correlation between columns in a pair is given by either the p-value of a corresponding chi-squared test or by the value of a mean-square contingency.

Column pairs within which soft functional dependencies and correlations are found are prioritized in order of optimization potential, from which a selected set is provided to a query optimizer. Thus, a query optimizer is enabled to track statistics on column pairs having the greatest potential for impact in query optimization. For each selected pair $(C_1, C_2)$, a query optimizer collects a column group statistic, denoted by $|C_1, C_2|$, which is the number of distinct combinations of values in each column. Using a column group statistic allows a query optimizer to produce an improved selectivity estimate, $S'_{p_1,p_2} = 1/|C_1, C_2|$, for the execution of a query plan.

BRIEF DESCRIPTION OF THE DRAWINGS

FIG. 2 is a correlation detection algorithm of the present invention.

FIG. 5 is a column group statistic recommendation algorithm for a query optimizer.

DESCRIPTION OF THE PREFERRED EMBODIMENTS

Figure 1A:
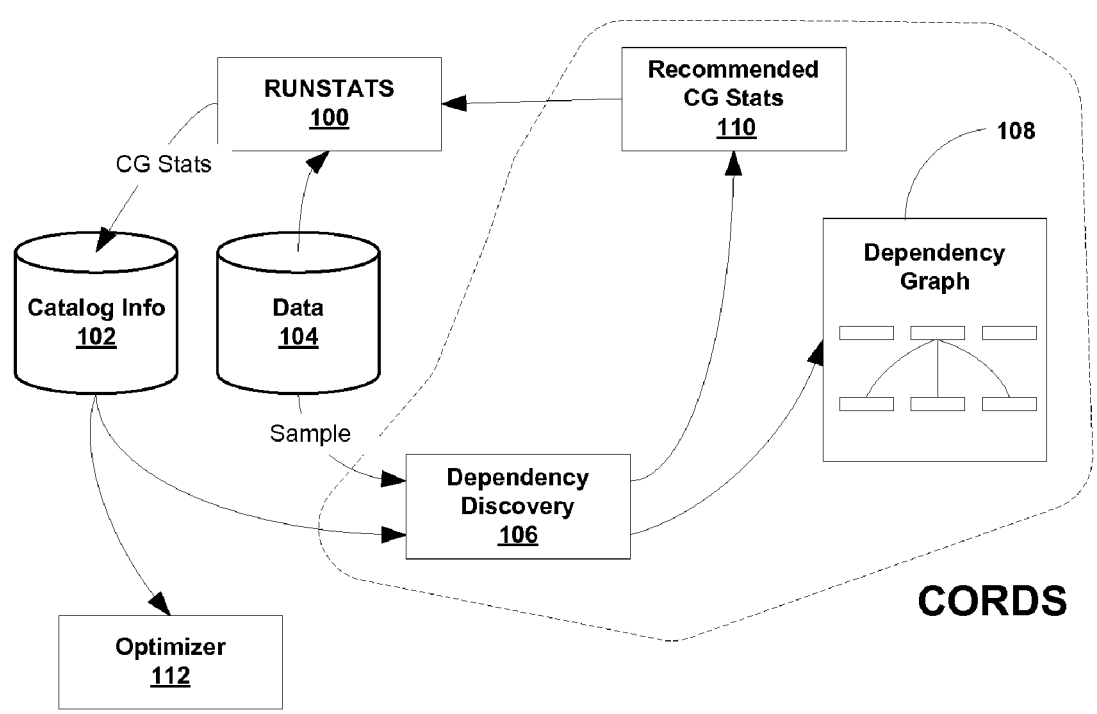
FIG. 1*a* illustrates a general system diagram of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Referring now to FIG. 1a, a general system diagram of the present invention (hereafter, CORDS) is shown. A database utility, DB2 RUNSTATS 100, collects statistics on data in a relational database and records them in an associated system catalog 102. Relational data 104 is sampled; data is analyzed to determine dependencies and correlations 106; and in one embodiment, dependencies and correlations are displayed in dependency graph 108. Column group statistics for column pairs between which dependencies and correlations are displayed are also recommended and a profile is made. Column group statistics are then recommended 110 to DB2 RUNSTATS 100 utility. The next time DB2 RUNSTATS 100 collects statistics, it collects the recommended column group statistics. Query optimizer 112 obtains column group statistics from system catalog 102, and computes adjustments to a query execution plan (QEP). After estimating cardinalities and total cost for an adjusted query plan, query optimizer outputs an optimal, least-cost QEP.

Generation of Candidate Pairs

Figure 1B:
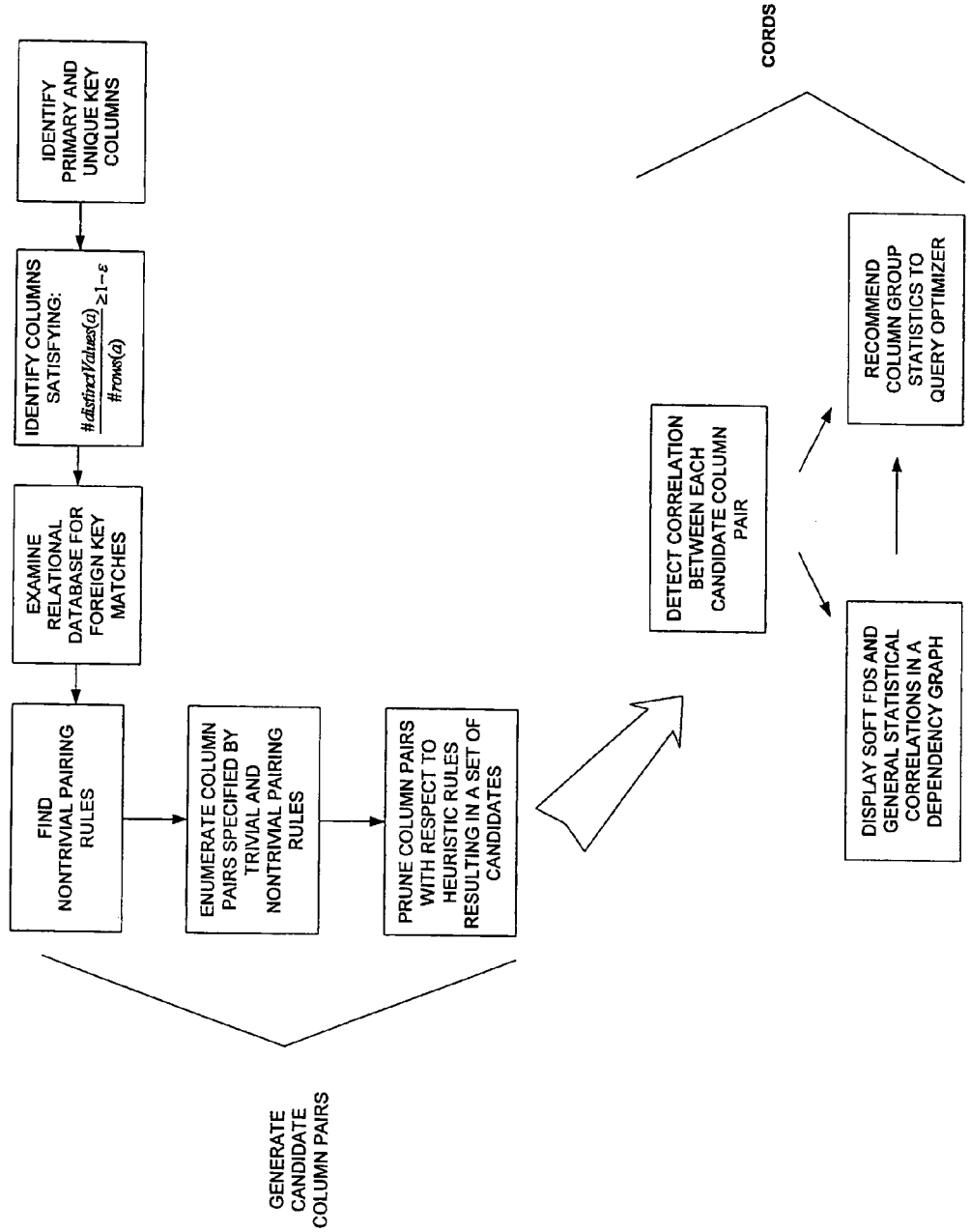
FIG. 1*b* illustrates a general process flow for the method of the present invention.

Shown in FIG. 1b is a general process flow diagram for CORDS and associated preliminary phases. Beginning with a preliminary phase, candidate pairs of columns are generated for subsequent correlation testing. A candidate is defined as a triple $(a_1, a_2, P)$, where $a_i$ (i=1, 2) is an attribute of the form R.c (e.g., EMPLOYEES.ID, ACCOUNTS.Balance). A pairing rule, P, specifies how each attribute value in column $a_1$ is paired with an attribute value in column $a_2$ in order to form a set of potentially dependent or correlated attribute-value pairs. When both attribute columns lie in the same table, R, and each $a_1$ value is paired with an $a_2$ value in the same row, pairing rule P is trivial and is denoted by the symbol, $\emptyset_R$. A nontrivial pairing rule describes the manner in which a table is joined with itself, if each $a_1$ value is paired with an $a_2$ value not in the same row. When attribute columns $a_1$ and $a_2$ lie in different tables that are joined during query processing; pairing rule P is specified as a two-table join predicate.

Candidates column pairs are generated by first discovering pairing rules and then, for each pairing rule, enumerating all column pairs specified by this pairing rule. Each discovered non-trivial pairing rule, P, connects a pair of tables R and S, and generates candidate column pairs of the form (R.a, S.b, P). Each discovered trivial pairing rule refers to a table R, and generates candidate column pairs of the form (R.a, R.b, $\emptyset_R$)

In one embodiment, nontrivial pairing rules discovered are those that appear to be primary-key-to-foreign-key join predicates, since such join predicates are likely to occur in query workloads. To find such nontrivial pairing rules, a set K comprised of columns declared as either primary or unique keys is identified, along with each column a not declared a key, for which the following inequality is satisfied:

$$\frac{\# \, distinctValues(a)}{\# \, rows(a)} \geq 1 - \varepsilon \quad (1)$$

where $\varepsilon$ is a user or system-specified tolerance. For each column a in set K, every other column in a relational database is examined to find potential foreign-key columns to complete a pairing rule. A column b is considered a foreign-key match for column a if either column a is a declared primary key and column b is a declared foreign key for the primary key, or if every attribute value in a sample from column b has a matching attribute value in column a.

In tandem with the generation of candidate pairs, a flexible set of heuristic pruning rules are applied to limit the total number of candidate pairs that are subsequently analyzed. Pruning rules are comprised of: type constraints in which candidate columns whose data type does not belong to a specified set are pruned (i.e., columns with non-integer data, columns with strings of less than ten characters); statistical constraints in which tables and columns that do not have specified statistical properties are pruned (i.e., columns with few distinct values or tables with few rows); pairing constraints in which candidates whose pairing rules fail to meet specified criteria are pruned (i.e., pairing rules that correspond to explicitly declared primary-key-to-foreign-key relationships); and workload constraints in which candidate columns that do not appear at least once in an equality predicate in a query workload are pruned. Candidate column pairs not pruned are subsequently analyzed for spurious correlations, statistical correlations, and functional dependencies.

Correlation Detection Algorithm Overview

Shown in FIG. 2 is a correlation detection algorithm of CORDS. For simplicity, shown in FIG. 2 is an exemplary embodiment in which two input columns of interest both lie in some table R, are related via a trivial pairing rule, $\emptyset_R$, and contain categorical, discrete-valued data. In another embodiment, columns of interest contain numerical data. In yet another embodiment in which pairing rule P is nontrivial, modifications to CORDS are straightforward; table R results from executing a join query on separate tables, as specified by P.

In CORDS shown in FIG. 2, $|C|_T$ denotes the number of distinct values in column C of table T and $|T|$ denotes the number of rows in table T. Similarly, $|C_1, C_2|_T$ denotes the number of distinct values in the concatenation of columns $C_1$ and $C_2$ in table T. The jth most frequent value in a column $C_i$ is denoted by $V_{ij}$ and the corresponding frequency of the value is denoted by $F_{ij}$. $N_i$ denotes the number of frequent values for $C_i$ stored in a database system catalog. Additionally, $d_i$ denotes the number of distinct categories for $C_i$ attribute values in a chi-squared test. Finally, $G_v^{-1}$ denotes the inverse cumulative distribution function of a chi-squared random variable with v degrees of freedom. CORDS parameters $\varepsilon_1$ through $\varepsilon_5$ are small positive constants between zero and one and parameter p is a specified maximum allowable probability for a false-positive or false-negative chi-squared test result. Additionally, columns are labeled in a manner such that $|C_1|_R \geq |C_2|_R$.

Trivial Cases

In a first step of correlation detection, trivial cases are discovered by obtaining quantities $|C_i|_R$ and $|R|$ from a relational database system catalog. In step 200, the number of distinct values in each column $C_i$ is compared to table cardinality $|R|$; if such a comparison satisfies the inequality, $|C_i|_R \geq$ $(1-\epsilon_1)|R|$, then it is determined column $C_i$ is a soft key. A soft key column is trivially statistically correlated to every other column in R because a value sampled from $C_i$, determines, with high probability, the row and hence, an associated value in any other column. Therefore, CORDS eliminates an input column pair if at least one column is a soft key and subsequently terminates. In step 202, CORDS similarly eliminates an input column pair and terminates if at least one column is single-valued; for example, if $|C_i|_R=1$, then each column $C_j$ with $j \neq i$ functionally determines $C_i$ in a trivial manner.

Random Sampling

If CORDS has not discovered a trivial case for an input column pair, then data is sampled from an input column pair in preparation for further analyses. In step 204, rows of table R are randomly sampled to produce a reduced table S. In one embodiment, between 2,000 and 10,000 rows are sampled. In another embodiment, the following approximation is used to determine a number n of rows to sample from table R:

$$n \approx \frac{[-16v\log(p\sqrt{2\pi})]^{1/2} - 8\log(p\sqrt{2\pi})}{1.69\delta(d-1)v^{-0.071}} \quad (2)$$

In (2), $v=(d_1-1)(d_2-2)$, $d=\min(d_1, d_2)$, and $d_1$ and $d_2$ are the number of categories $C_1$ and $C_2$, respectively, to be used in a chi-squared test for correlation, as determined from catalog statistics during value categorization described subsequently. Finally, $\delta$ is a small constant and p is the probability of either: incorrectly declaring an input column pair to be independent when mean-square contingency, $\phi^2$, satisfies $\phi^2 > \delta$; or incorrectly declaring an input column pair to be dependent when $\phi^2 < \delta$. Mean-square contingency is defined by $$\phi^2 = \frac{1}{d-1} \sum_{i=1}^{d_1} \sum_{j=1}^{d_2} \frac{(\pi_{ij} - \pi_i.\pi_{.j})^2}{\pi_i.\pi_{.j}}. \quad (3)$$

In Eqn. (3), quantity $\pi_{ij}$ is the fraction of $(C_1, C_2)$ value pairs in table R of the form $(x_i, x_2)$ for which $x_1$ belongs to category i and $x_2$ belongs to category j, and quantities $\pi_i.$ and $\pi_{.j}$ denote marginal totals;

$$\pi_i. = \sum_j \pi_{ij} \text{ and } \pi_{.j} = \sum_i \pi_{ij},$$

respectively. The case in which $\phi^2=0$ corresponds to complete "independence" of a joint frequency distribution: $\pi_{ij}=\pi_i.\pi_{.j}$ for all values of i and j.

In one embodiment, a value for $\delta$ is chosen by considering a hypothetical set of $|R|$ data pairs such that data pairs are generated according to a random mechanism for which two components of a pair are truly statistically independent, and subsequently choosing $\delta$ so that $\phi^2$ exceeds $\delta$ with a small probability (e.g., less than 0.01). The value of $\delta$ is typically very small (e.g., for $d=20$, $\delta \approx 20/|R|$, where $|R|$ typically exceeds 1,000,000).

Soft Functional Dependency Detection and Identification

Continuing on to step 206, reduced table S is queried to obtain $|C_1|_S$, $|C_2|_S$ and $|C_1, C_2|_S$. In step 208, CORDS asserts the existence of a soft FD, $C_1 \Rightarrow C_2$, if $|C_1|_S/|C_1, C_2|_S$ is close to 1, specifically, if $|C_1|_S \geq (1-\epsilon_3)|C_1, C_2|_S$. CORDS also requires in step 208 that $|S|$ is much greater than $|C_1|_S$, specifically, that $|C_1|_S \leq \epsilon_2|S|$. Intuitively, if sample S is so small that most column-value pairs (x,y) are distinct, the likelihood is increased for the detection of a spurious FD.

The strength of a soft FD $C_1 \Rightarrow C_2$ is defined as $|C_1|_R/|C_1, C_2|_R$. The strength of a soft FD is less than or equal to 1, and a soft FD with strength equal to 1 coincides with a hard FD. CORDS estimates the strength of a soft FD by $|C_1|_S/|C_1, C_2|_S$.

Skew Handling and Categorization for Chi-Squared Test

If CORDS does not assert the existence of a soft FD for an input column pair, then CORDS analyzes a chi-squared test for forms of correlation that are more general than soft FDs. To prepare data for a chi-square test, CORDS decomposes the domain of values for each column into a number of disjoint categories, and then creates a contingency table from reduced table S obtained from by sampling step 204. A contingency table is a two-dimensional array of $n_{ij}$ values along with the marginal row ($n_i.$) and column ($n_{.j}$) totals; $n_{ij}$ is interpreted as the number of $(C_1, C_2)$ value pairs $(x_1, x_2)$ in S such that $x_1$ belongs to category i and $x_2$ belongs to category j, respectively.

CORDS constructs the contingency table so as to ensure that each $n_{ij}$ is sufficiently large. Specifically, in step 210, CORDS examines for each column the n-most-frequent-value statistics (recorded in a system catalog) to check whether the most frequently-occurring values for a column account for a majority of values, such that data distribution is noticeably skewed. If the data distribution is determined to be skewed in step 210 then subsequently, in step 212, CORDS filters out infrequent values from sampled data, so that the chi-square test is applied to frequent values. Otherwise, if data distribution is not identified as skewed in step 210, CORDS continues to step 214. After an initialization in step 214, CORDS constructs a contingency table in step 216. If data distribution for an input column has been identified as skewed in step 210, then frequently-occurring values determined from a consultation of a system catalog are used as categories in construction of a contingency table. Otherwise, CORDS bucketizes data values by hashing, in effect creating categories by dividing the domain of column values into equal size subsets. CORDS also uses a bucketization approach to categorize real-valued data, in which case categories correspond to disjoint sub-intervals of the real number line.

Sampling-Based Chi-Squared Test

In step 218, CORDS declares columns $C_1$ and $C_2$ to be correlated if there are more than a given number of zeros in the contingency table constructed in step 216, wherein zeros persisting as categories despite hashing and bucketization are considered structural zeros. If there are less than a given number of zeros, then the chi-squared test is applied. Specifically, in step 220, a chi-square statistic is computed according to the equation $$\chi^2 = \sum_{i=1}^{d_1} \sum_{j=1}^{d_2} \frac{(n_{ij} - n_{i\square}n_{\square j})^2}{n_{i\square}n_{\square j}} \quad (4)$$

In step 222, an input column pair is identified as correlated if $\chi^2$ exceeds a critical value given by $t=G_v^{-1}(1-p)$. Essentially, if mean-square contingency $\phi^2$ is less than $\delta$ implying independence of input columns, then the probability that $\chi^2 > t$ is less than p. If $\phi^2$ exceeds $\delta$, implying a correlation between columns in an input pair, then the probability that $\chi^2 < t$ is less than p.

In an alternative embodiment of step 222, a quantity $p^* = 1 - G_v(\chi^2)$ is computed and an independence hypothesis is rejected if $p^*$ is less than a cutoff value p-value; a p-value being the probability of encountering a value of $\chi^2$ at least as large as an actual value, given that chosen attributes are truly independent. Thus, a p-value is inversely proportional to the probability that input columns are correlated and a cut-off value for p-value is the maximum allowable probability of incorrectly asserting correlation in the presence of independence.

Dependency Graph—Displaying Results

Figure 3:
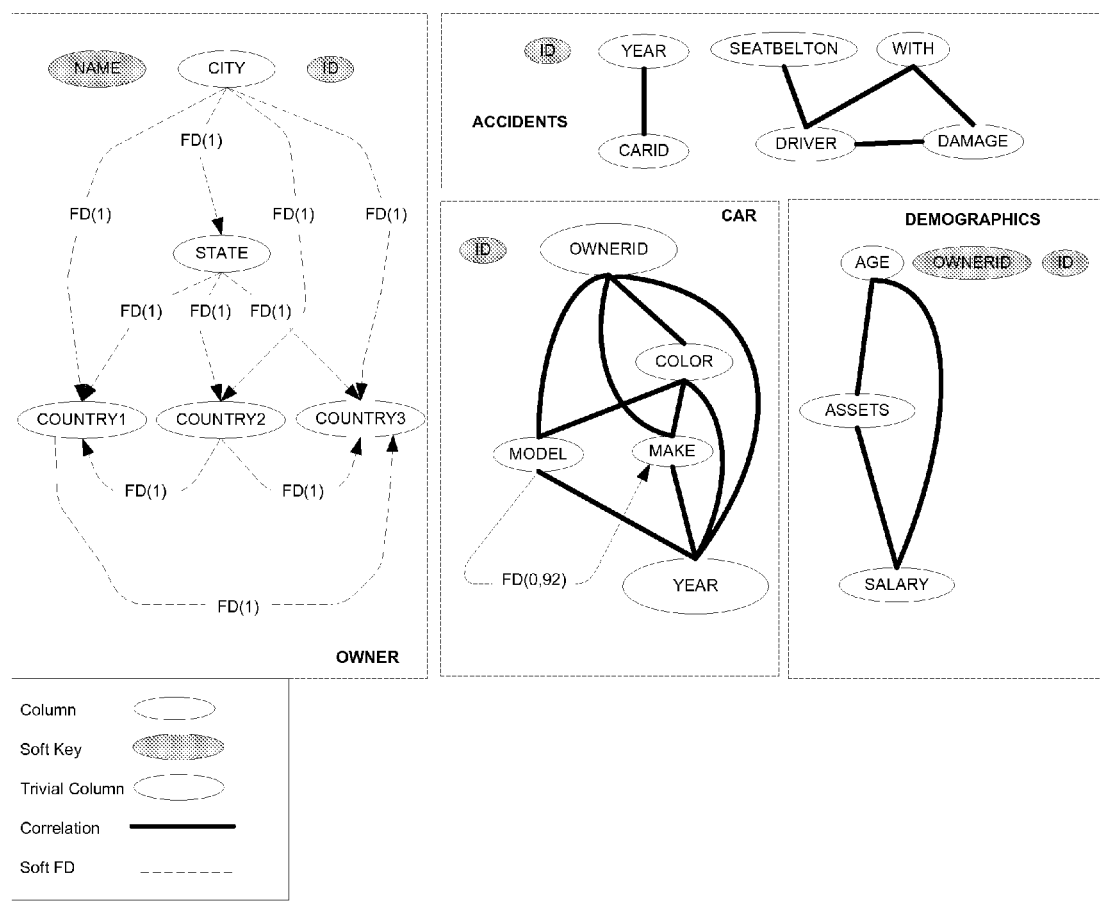
FIG. 3 illustrates a dependency graph representing correlations detected between column pairs in a relational database.

Referring now to FIG. 3, exemplary CORDS output is displayed as a dependency graph in which node pairs represent column pairs and edges connecting node pairs correspond to correlation or soft FD relationships. Properties of edges, (e.g., cost, thickness, color) are used to indicate the strength of a soft FD relationship between columns in a pair as well as the degree of correlation between columns in a pair. For soft FDs, such a property is an increasing function of estimated strength and for degree of correlations, such a property is either of: a decreasing function of a statistical p-value or an increasing function of an estimated mean-square contingency, $\hat{\phi}^2$, where $\hat{\phi}^2 = \chi^2/(n(d-1))$, with $\chi^2$ defined as in Eqn. (4), $d = \min(d_1, d_2)$ as before, and n equal to the number of rows in the reduced table S.

Query Optimization—Use of Column-Group Statistics and Recommendations

To estimate the selectivity of a conjunctive predicate $p_1 \hat{} p_2$ for two columns $C_1$ and $C_2$ from some specified table, where each $p_i$ is an equality predicate of the form $C_i = v_i$, a query optimizer produces a selectivity estimate by estimating an initial selectivity of each $p_i$ as $S_{p_i} = 1/|C_i|$, where $|C_i|$ is the number of distinct values in $C_i$, and then obtaining a final selectivity estimate as $S_{p_1 \hat{} p_2} = S_{p_1} \cdot S_{p_2} = 1/|C_1| \cdot 1/|C_2|$.

The foregoing selectivity estimates for the individual predicates $p_1$ and $p_2$, assume that values in each column are uniformly distributed, and that $C_1$ and $C_2$ are independent. CORDS provides a query optimizer with a set of CG statistics to provide for underestimation of the true selectivity by orders of magnitude.

CORDS identifies a set of column pairs that are strongly correlated; for each such pair $(C_1, C_2)$, a query optimizer collects a CG statistic $|C_1, C_2|$, the number of distinct combinations of values in the two columns. The optimizer then produces an improved selectivity estimate $S'_{p_1 \hat{} p_2} = 1/|C_1, C_2|$. To create an improved estimate, an adjustment factor for $S_{p_1 \hat{} p_2}$, $|C_1| |C_2|/|C_1, C_2|$, is applied to a selectivity estimate made by a query optimizer. Such an adjustment factor is equal to 1 when input columns are truly independent and increases proportionally with the degree of correlation between columns in an input pair.

Figure 4:
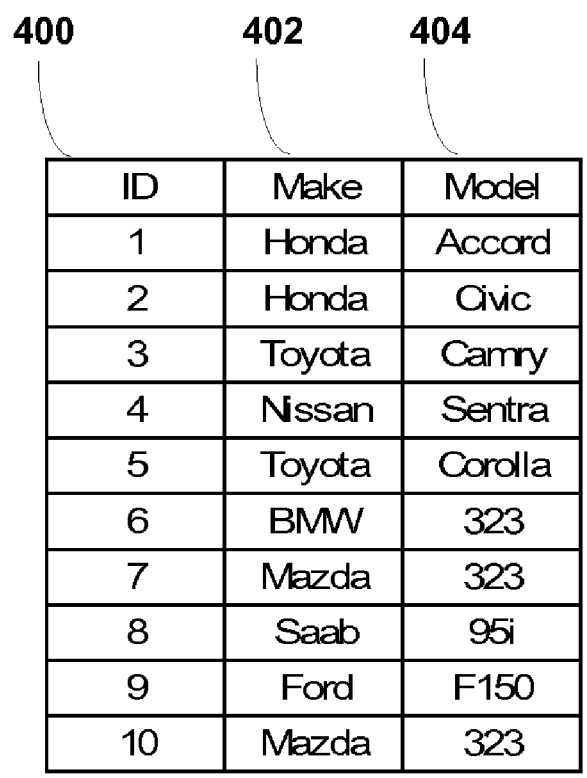
FIG. 4 illustrates an exemplary correlated column pair.

Referring now to automobile data in FIG. 4, a query having a selection predicate $p_1 \hat{} p_2$, where $p_1$="Make=Honda" and $p_2$="Model=Accord" is issued against ID column 400, "Make" column 402, and "Model" column 404. The true selectivity of this predicate is $\sigma_{p_1 \hat{} p_2} = 1/10$. The naïve estimate is $S_{p_1 \hat{} p_2} = 1/|\text{Make}| \cdot 1/|\text{Model}| = 1/7 \cdot 1/8 = 1/56$, which underestimates the true selectivity by a factor of 5.6, or about −82%. After applying an adjustment factor of $|\text{Make}| |\text{Model}|/|\text{Make, Model}| = 56/9$, an adjusted selectivity estimate of $S'_{p_1 \hat{} p_2} = 1/9$, is obtained.

In FIG. 5, an algorithm for recommending column group statistics is shown. A query optimizer collects a detailed set of CG statistics comprising not only distinct-value information, but also the frequencies for the k most frequent values, along with quantiles, when prompted by CORDS. In step 500, correlated column pairs are prioritized by either of: ascending order of p-value or descending order of estimated mean-square contingency; both ensure a higher priority assigned to column pairs that are more strongly correlated. Soft FDs are prioritized in a descending manner according to estimated strength in step 502. A tie-breaking rule prioritizes column pairs with respect to an adjustment factor in step 504; column pairs upon which CG statistics have the greatest impact on improving query optimizer selectivity estimates are given a higher priority. In another embodiment, an adjustment factor is used as a primary prioritization criterion rather than a tie-breaker. Lastly, in step 506, query optimizer stores recommended CG statistics for $k_1$ prioritized correlated column pairs and $k_2$ prioritized soft FDs.

CORDS advantageously exploit query workload information to limit the search space of possibly correlated column pairs; additionally, CORDS also exploits schema constraints and semantics provided by users. CORDS approach is also well-suited to integration with a QFS such as LEO. In contrast with prior art approaches, CORDS handles either numerical or categorical data.

Because CORDS identifies correlated columns pairs instead of producing detailed approximations as to a joint attribute frequency distribution for the pair, overhead is typically much lower than that of more elaborate techniques. Another advantage lies in the use of sampling to further reduce overhead relative to other methods, so thus making CORDS well-suited to real-world databases having thousands of tables and hundreds of columns per table. Lastly, CORDS provides benefits by efficient dealings with data that is continually changing, since re-checking column pairs for correlation is less expensive than updating a multivariate distribution synopsis of data values in a relational database.

Additionally, the present invention provides for an article of manufacture comprising computer readable program code contained within implementing one or more modules to detect correlations and soft functional dependencies between column pairs in one or more relational databases. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) selecting column pairs from a relational database or databases; (b) sampling value pairs from selected column pairs; (c) identifying column pairs between which functional dependencies exist; (d) preparing remaining column pairs for test of statistical correlation; (e) testing correlation between sampled value pairs in a prepared set of column pairs; (f) graphically displaying results of discovery; (g) prioritizing column pairs between which correlations or soft functional dependencies exist; and (h) recommending prioritized column pairs for use in query optimization.

CONCLUSION

A system and method has been shown in the above embodiments for effectively implementing data correlation detection. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

We claim:

1. An article of manufacture comprising computer storage medium having computer readable program code embodied therein which, implements an a priori identification of dependencies and discovery of correlations between column pairs from one or more relational databases and applying said discoveries in query optimization, said medium comprising computer readable program code for:
   a. selecting column pairs from said relational databases;
   b. collecting a random sample of value pairs from said selected column pairs to produce a reduced table S;
   c. identifying functionally dependent column pairs in said selected column pairs by detecting soft functional dependencies between value pairs in said collected random sample of value pairs in said reduced table S, said soft functional dependency between a first column $C_1$ and a second column $C_2$ defined as $|C_1|_S/|C_1,C_2|_S \approx 1$, said $|C_1|_S$ denoting number of distinct values in column $C_1$ of reduced table S, said $|C_1,C_2|_S$ denoting number of distinct values in a concatenation of columns $C_1$ and $C_2$ of reduced table S;
   d. preparing a set of value pairs using system catalog statistics for said relational databases; said set of value pairs comprising value pairs from said collected random sample of value pairs for which soft functional dependencies are not detected;
   e. identifying correlated column pairs in said selected column pairs by testing for correlations between value pairs in said prepared set of value pairs using a chi-squared test; and
   f. outputting to a query optimizer, said functionally dependent column pairs and said correlated column pairs, said query optimizer utilizing said functionally dependent column pairs identified and said correlated column pairs in query optimization.

2. An a priori method of identifying dependencies and discovering correlations between column pairs from one or more relational databases and applying said discoveries in query optimization; said method comprising:
   a. selecting column pairs from said relational databases;
   b. collecting a random sample of value pairs from said selected column pairs to produce a reduced table S;
   c. identifying functionally dependent column pairs in said selected column pairs by detecting soft functional dependencies between value pairs in said collected random sample of value pairs, said soft functional dependency between a first column $C_1$ and a second column $C_2$ defined as $|C_1|_S/|C_1,C_2|_S \approx 1$, said $|C_1|_S$ denoting number of distinct values in column $C_1$ of reduced table S, said $|C_1,C_2|_S$ denoting number of distinct values in a concatenation of columns $C_1$ and $C_2$ of reduced table S;
   d. preparing a set of value pairs using system catalog statistics for said relational databases; said set comprised of value pairs in said collected sample for which soft functional dependencies are not detected;
   e. identifying correlated column pairs in said selected column pairs by testing for correlations between value pairs in said prepared set of value pairs using a chi-squared test; and
   f. outputting to a query optimizer implemented as computer readable program code stored in computer storage of a computer, said functionally dependent column pairs and said correlated column pairs, said query optimizer utilizing said functionally dependent column pairs and said correlated column pairs in query optimization.

3. The a priori method of claim 2, wherein said selected column pairs are selected based on:
   a. generating candidate column pairs from said relational databases;
   b. pruning said generated candidate column pairs with respect to a set of heuristic constraints; and
   c. eliminating trivial instances of correlation in said generated candidate column pairs; said trivial instances of correlation identified by system catalog statistics for said relational databases.

4. The a priori method of claim 3, wherein said heuristic constraints are based on at least one of: data types, statistical properties of said generated candidate column pairs, schema information, or query workload information.

5. The a priori method of claim 3, wherein a ratio of a first cardinality of distinct value pairs in one of said selected column pairs to a second cardinality of distinct value pairs in said relational databases is used to identify and eliminate said trivial instances of correlation.

6. The a priori method of claim 5, wherein said trivial instance of correlation indicates a soft key if said ratio is either greater than or equal to, a parameter value subtracted from one.

7. The a priori method of claim 5, wherein each of said trivial instances of correlation indicates a trivial column when said ratio for at least one of said selected column pairs is equal to one.

8. The a priori method of claim 2, wherein said soft functional dependencies are detected based on a ratio of a first cardinality of distinct value pairs in one of said selected column pairs to a second cardinality of distinct combinations of said collected random sample of value pairs in one of said selected column pairs; said soft functional dependencies indicated by said ratio being either of: greater than or equal to, a parameter value subtracted from one, if said collected random sample is larger than a cardinality of distinct value pairs in said one of said selected column pairs.

9. The a priori method of claim 2, wherein said soft functional dependencies have a strength corresponding to a ratio of a cardinality of distinct value pairs in one of said selected column pairs divided by a cardinality of distinct combinations of value pairs in said one of said selected column pairs.

10. The a priori method of claim 2, wherein said step of preparing a set of value pairs is based on:

a. obtaining frequently-occurring value pairs from said system catalog statistics;
b. if said obtained frequently-occurring value pairs account for a proportion of said collected random sample of value pairs such that a statistical distribution of said collected random sample of value pairs is skewed, filtering infrequently occurring value pairs in said collected random sample of value pairs, else,
bucketizing said collected random sample of value pairs by hashing into equal size subset buckets; and
c. creating a number of disjoint categories equal to a number of either of: said subset buckets or said frequently-occurring value pairs; said categories computed for said chi-squared test; and
d. building a contingency table for said chi-squared test; said contingency table comprising values from said selected column pairs.

11. The a priori method of claim 10, wherein said correlated column pairs are detected on a basis of structural zeros in said contingency table.

12. The a priori method of claim 10, wherein result of said chi-squared test determines a degree of correlation in said correlated column pairs.

13. The a priori method of claim 10, wherein sampling error in said chi-squared test is adjusted by statistical sample variance of said random sample of value pairs.

* * * * *